United States Patent
Watanabe et al.

[11] Patent Number: 5,891,210
[45] Date of Patent: Apr. 6, 1999

[54] METHOD OF CONNECTING OPTICAL FIBERS

[75] Inventors: Tsutomu Watanabe; Shinji Ishikawa, both of Kanagawa, Japan

[73] Assignee: Sumitomo Electric Industries, Ltd., Osaka, Japan

[21] Appl. No.: 941,548

[22] Filed: Sep. 30, 1997

Related U.S. Application Data

[62] Division of Ser. No. 670,760, Jun. 21, 1996, Pat. No. 5,710,850.

[30] Foreign Application Priority Data

| Jun. 26, 1995 | [JP] | Japan | 7-159445 |
| Oct. 2, 1995 | [JP] | Japan | 7-254794 |
| Mar. 21, 1996 | [JP] | Japan | 8-64121 |

[51] Int. Cl.$^6$ ............ C03B 37/15; G02B 6/255
[52] U.S. Cl. ............ 65/406; 65/407; 65/409; 65/410
[58] Field of Search ............ 65/406, 407, 409, 65/410, 412, 501

[56] References Cited

U.S. PATENT DOCUMENTS

| 5,339,376 | 8/1994 | Kakii | 385/71 |
| 5,602,951 | 2/1997 | Shiota | 385/71 |
| 5,710,850 | 1/1998 | Watanabe et al. | 385/71 |

FOREIGN PATENT DOCUMENTS

| 0 001 278 | 4/1979 | European Pat. Off. |
| 0 098 548 | 1/1984 | European Pat. Off. |
| 0 241 724 | 10/1987 | European Pat. Off. |
| 0 408 926 | 1/1991 | European Pat. Off. |
| 0 484 850 | 5/1992 | European Pat. Off. |
| 0 652 184 | 5/1995 | European Pat. Off. |
| 59-228214 | 12/1984 | Japan |
| 61-25109 | 2/1986 | Japan |
| 2-103004 | 4/1990 | Japan |
| 2-281207 | 11/1990 | Japan |
| 2 022 859 | 12/1979 | United Kingdom |

OTHER PUBLICATIONS

Patent Abstracts of Japan, vol. 9, No. 105 (P–354), May 9, 1985 & JP–A–59 228214 (Furukawa Denki Kogyo et al.), Dec. 21, 1984.

*Primary Examiner*—Stanley S. Silverman
*Assistant Examiner*—Jacqueline A. Ruller
*Attorney, Agent, or Firm*—Pillsbury Madison & Sutro LLP

[57] ABSTRACT

The present invention provides a connecting member for facilitating connecting of optical fibers, and a connecting method in which the loss due to connecting is small. An optical fiber connecting member is composed of: a retaining portion having through-holes each of which has an inner diameter slightly larger than the outer diameter of optical fibers to be connected; and introduction portions which are integrally formed with and on the opposite end sides of the retaining portion and each of which has introduction grooves communicated with the through-holes to thereby make it easy to insert ends of the optical fibers into the through-holes. Further, the inner diameter of each of the through-holes is reduced by heating the connecting member to thereby make axis alignment of the optical fibers automatically to obtain connecting in which the connecting loss is reduced.

8 Claims, 15 Drawing Sheets

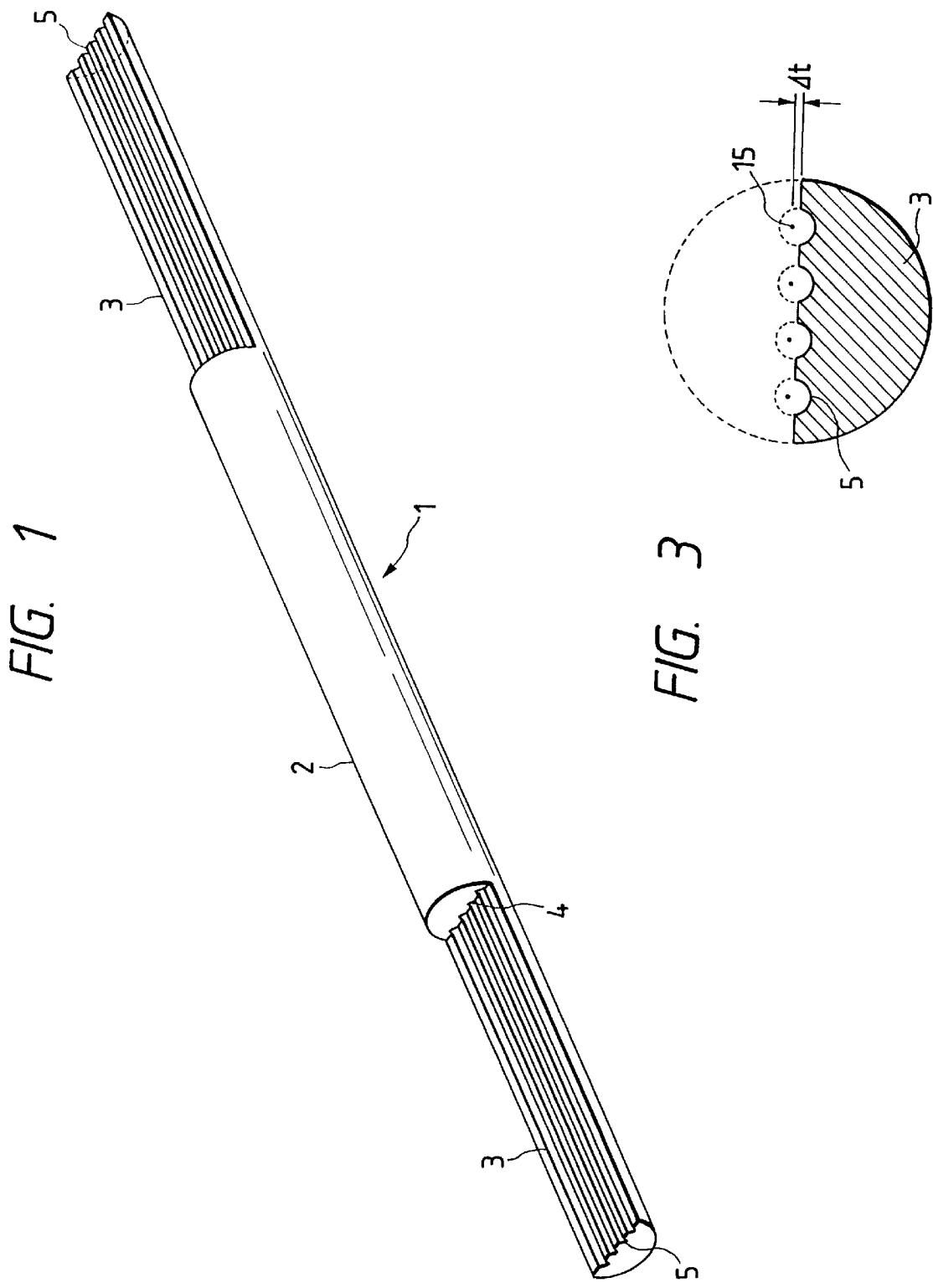

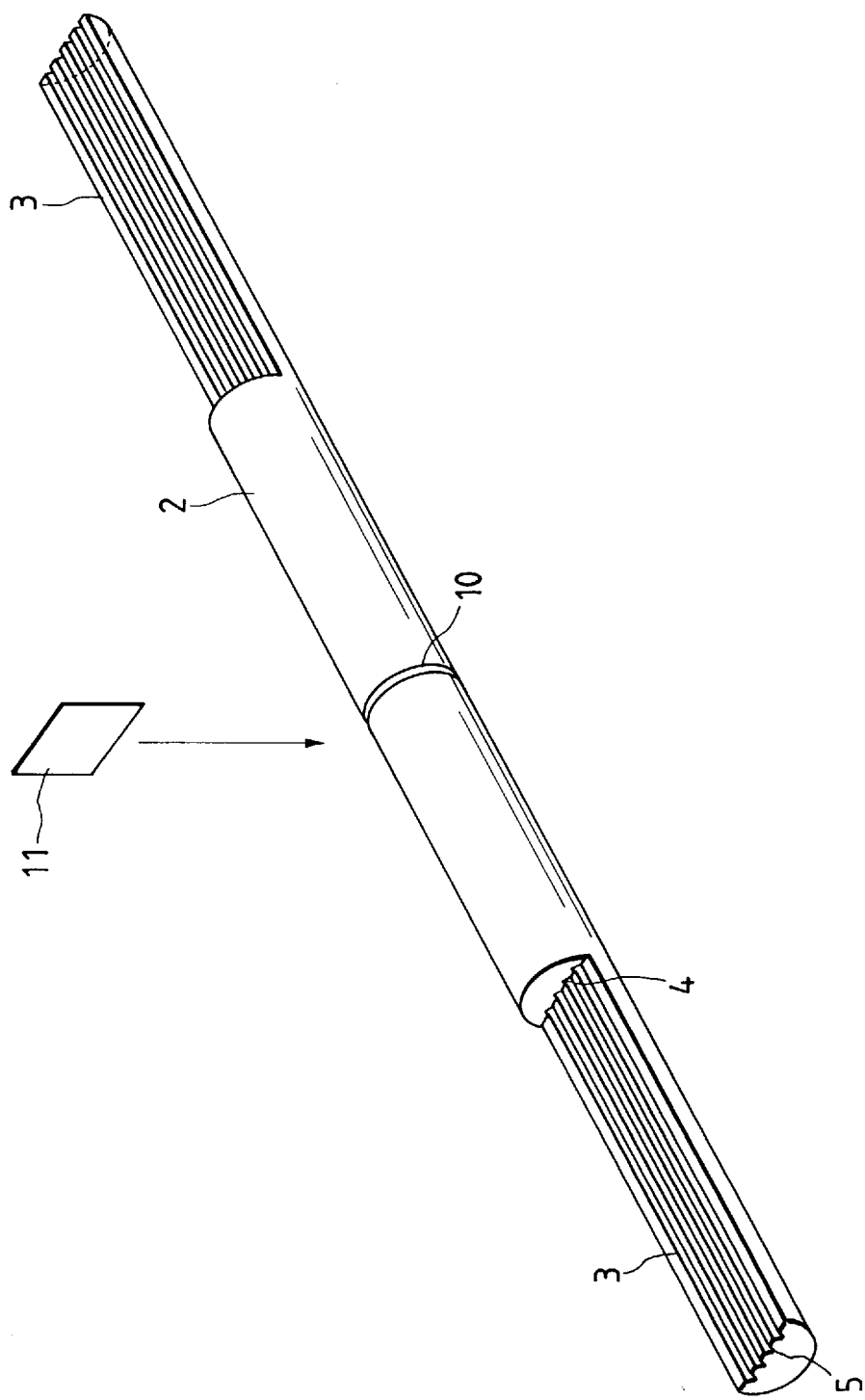

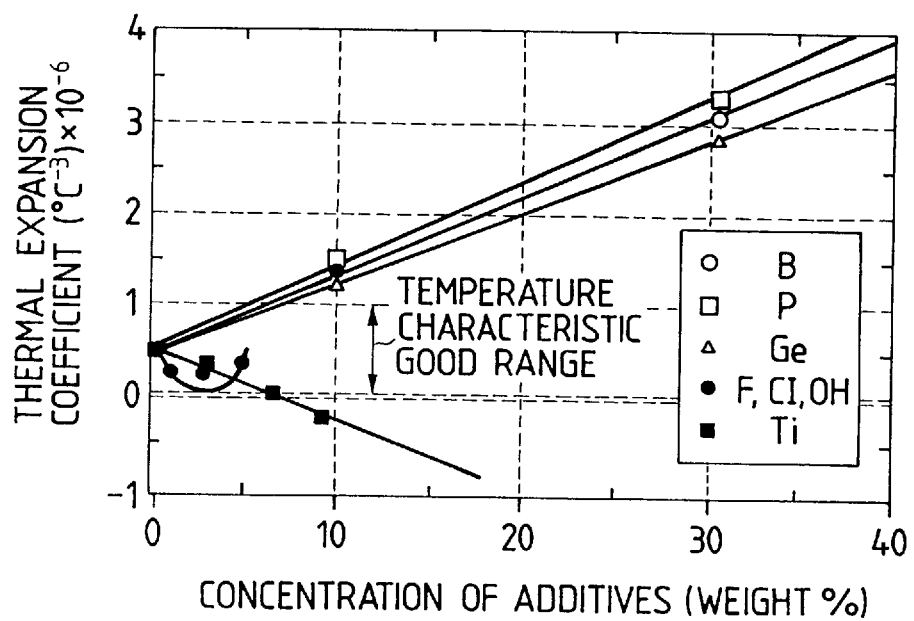

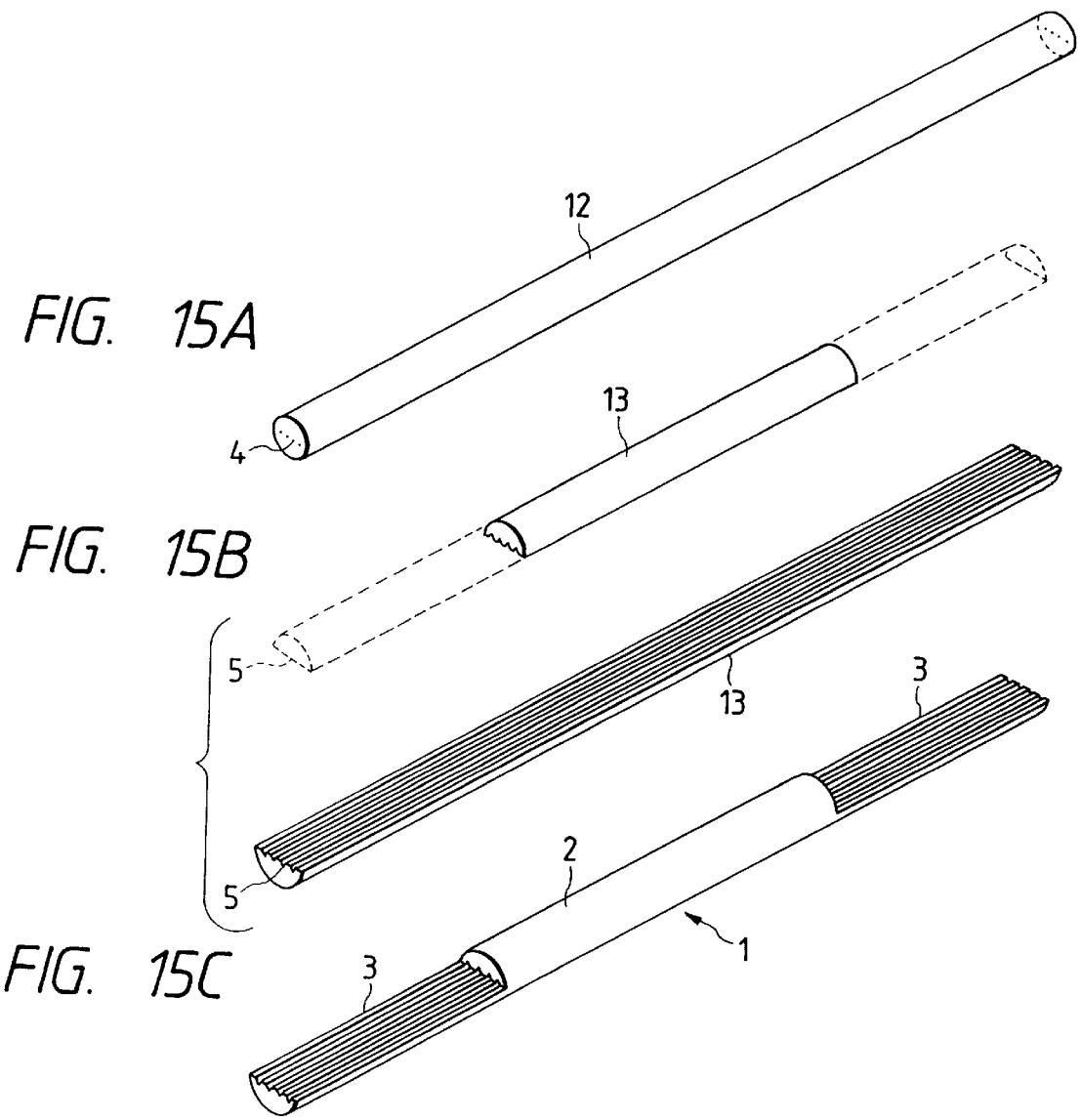
FIG. 15A
FIG. 15B
FIG. 15C
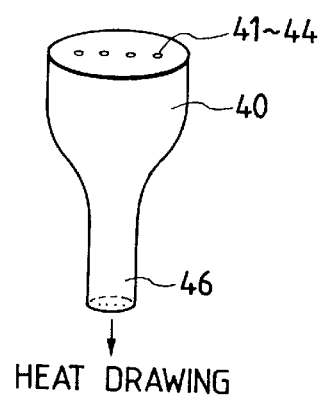
FIG. 15D
HEAT DRAWING

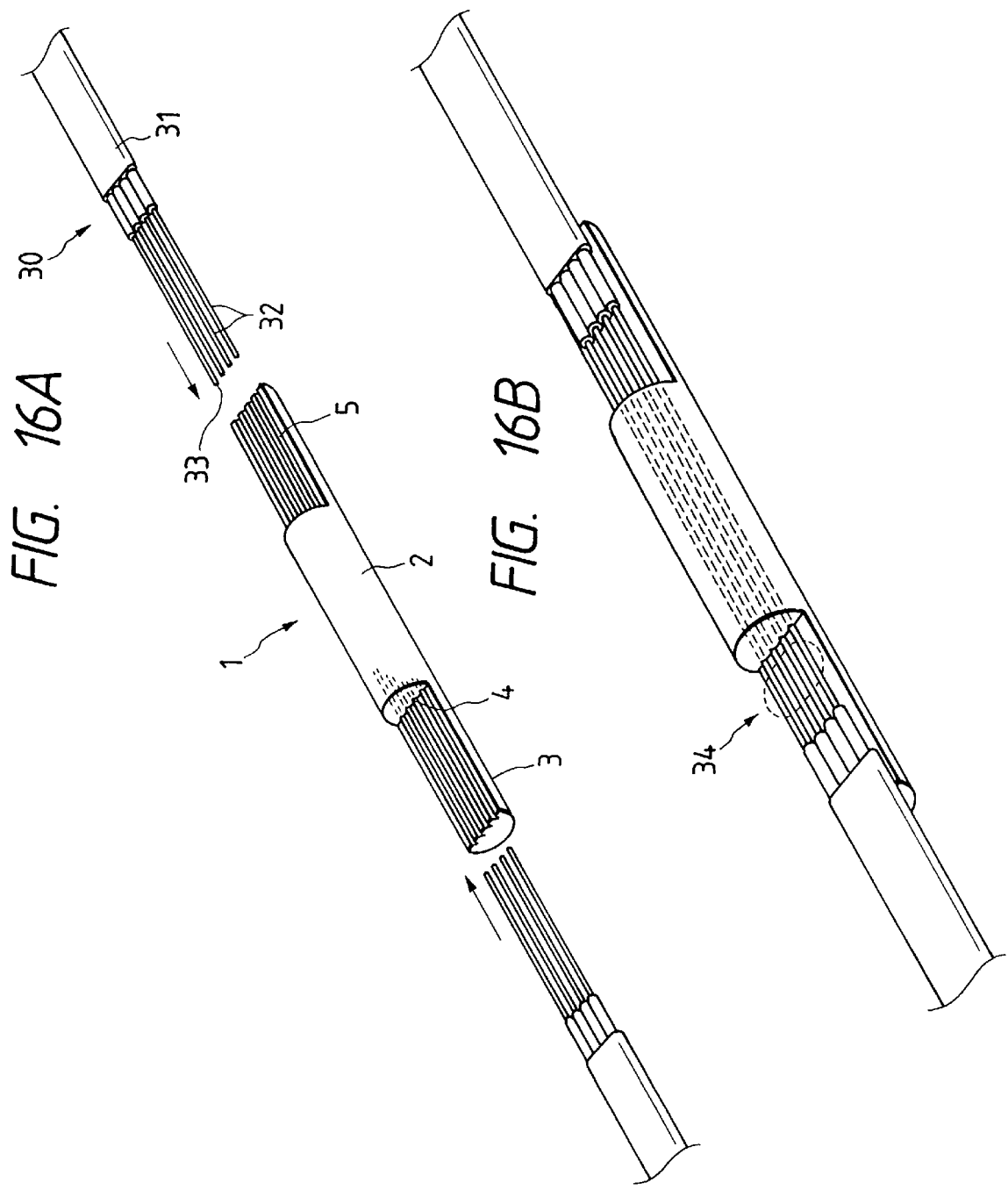

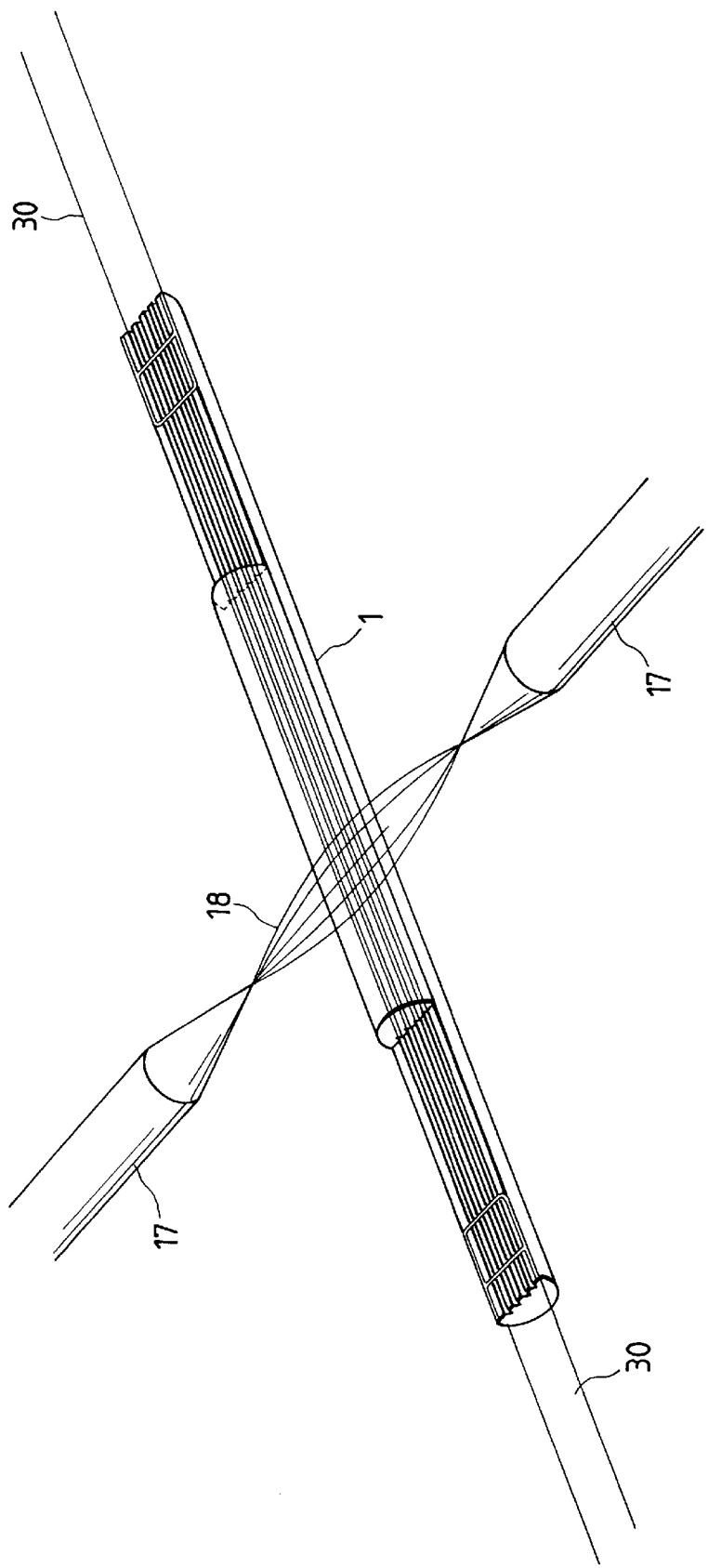

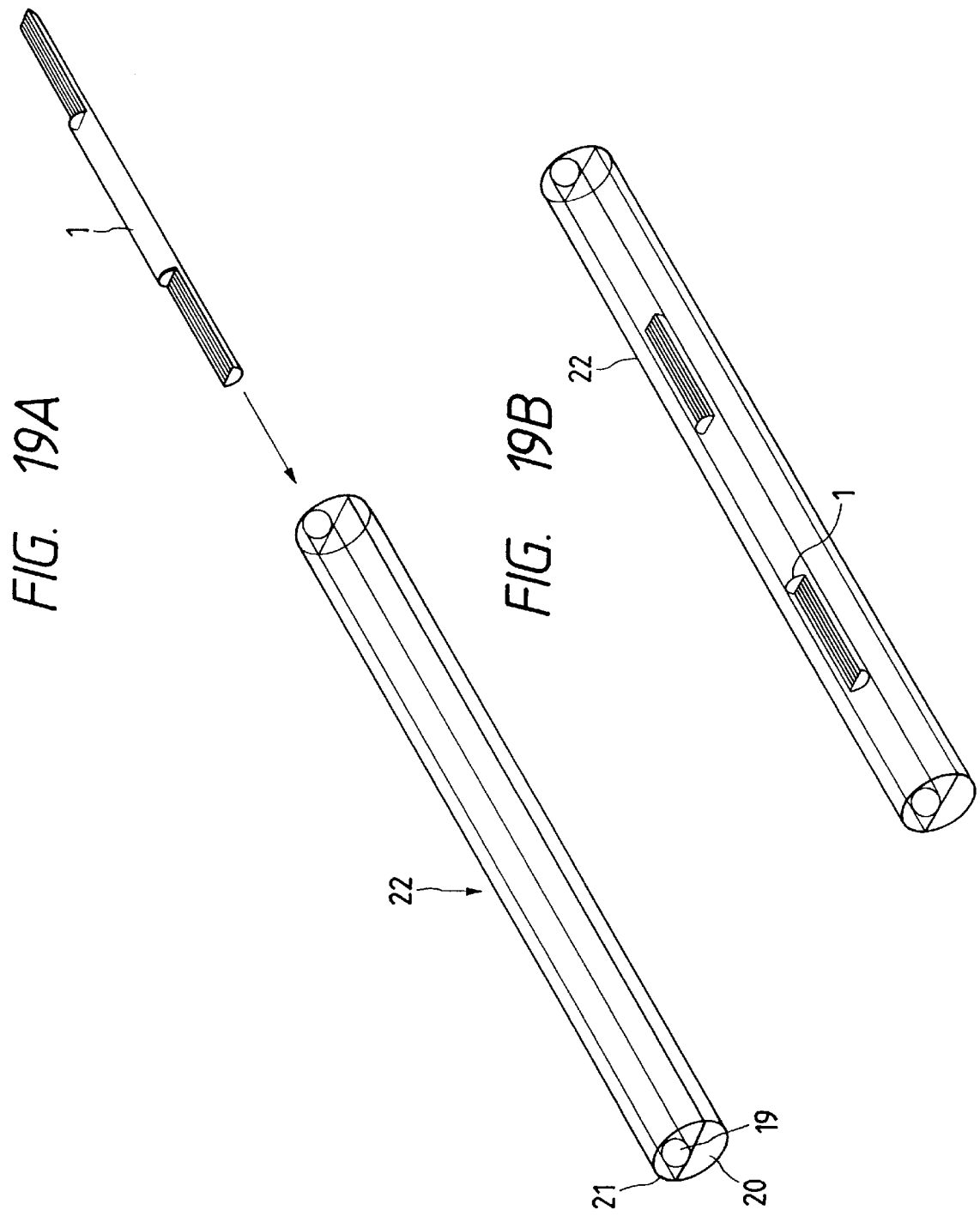

METHOD OF CONNECTING OPTICAL FIBERS

This is a division of application Ser. No. 08/670,760, filed Jun. 21. 1996, now U.S. Pat. No. 5,710,850.

BACKGROUND OF THE INVENTION

1. Field of the Invention

The present invention relates to an optical fiber connecting member for forming optical connecting by facing end portions of optical fibers each other, a method of producing the optical fiber connecting member, and a method of connecting optical fibers.

2. Description of the Related Art

Accompanying with the development of optical communication networks, optical fiber connecting has been required to satisfy low loss, low cost, high reliability and easiness of connecting. From this point of view, a fusion connecting method for fusing end portions of optical fibers with each other and a mechanical connecting method for retaining end portions of optical fibers merely in a physically facing state have been mainly developed as a stationary optical fiber connecting method for forming an optical communication network.

As the fusion connecting method, there is generally known a method in which heat-fusion is performed by means of arc discharge, or the like, after planishing connecting end surfaces of single-core or multi-core optical fibers, facing the connecting end portions of the optical fibers with each other through a V-groove and making axis alignment of the optical fibers by a moving mechanism under microscopic observation, for example, as described in Unexamined Japanese Patent Publication (kokai) No. Hei-2-281207.

As the mechanical connecting method, there is known a method in which optical fibers are fixed physically by an adhesive agent in the condition in which end portions of the optical fibers are inserted into a through-hole of a sleeve-like connecting member from opposite ends of the connecting member so as to be faced each other, for example, as described in Unexamined Japanese Patent Publication Nos. Sho-61-25109 and Hei-2-103004. With respect to multi-core optical fibers, there is also known a method in which optical fibers are fixed physically by heat-fusing a plurality of glass pipes or a body obtained by uniting the plurality of glass pipes after inserting the optical fibers into the pipes through V-grooves provided in opposite ends of the pipes, for example, as described in Unexamined Japanese Patent Publication No. Sho-59-228214. Besides the aforementioned methods, there is further known a method in which: optical fibers are faced each other in V grooves or inserted into a member having its inner diameter finished with high accuracy so as to be faced each other through V groves and pressure-stuck to each other by upper and lower plate members, or the like, to thereby fix connecting physically.

The fusion connecting method in which low-loss high-reliable connecting can be made, has however a problem in that a fusion-connecting apparatus for fusion connecting is expensive, in that a high-grade technique is required for retention of optical fibers, axis alignment of optical fibers, joining of optical fibers, or the like, by the fusion-connecting apparatus, and in that the time required for connecting becomes long.

On the other hand, the mechanical connecting method in which low-cost connecting can be performed by a simple technique of fixing optical fibers by inserting or arranging the optical fibers in a connecting member prepared in advance, has a problem in that this method is poor both in connecting loss and in reliability. The problem in the mechanical connecting method is mainly caused by discrepancy in axis of optical fibers forming connecting and by fixture of connecting. As a measure to solve the problem, the problem can be improved to some degree by highly accurately forming the optical fiber insertion through-hole of the connecting member.

Because optical fibers having an outer diameter of $125 \mu m$ are generally used, it is however difficult to accurately form the through-hole having a diameter slightly larger than the outer diameter of the optical fibers. Even if the through-hole can be formed accurately, it is difficult to insert optical fibers into the through-hole which is smaller than a needle hole. Therefore, the optical fiber inlet of the through-hole of the connecting member is required to be provided as a conical hole to facilitate insertion of optical fibers or a V-groove table is required for insertion guiding. With respect to connecting of single-core optical fibers, the problem upon insertion can be solved to some degree by providing these means.

In the case of connecting of multi-core fibers, especially in the case of connecting of tape-shaped multi-core optical fibers, however, a plurality of optical fibers should be inserted into a plurality of through-holes simultaneously because ends of the optical fibers are cut so as to be arranged in one line. Even if the ends of the optical fibers are cut so as to be arranged in one line accurately, the distances between the ends of the multi-core optical fibers may be widened by rebound due to electrification or the distances are not always uniform because the distances between optical fibers, especially tape-shaped multi-core optical fibers, may be designed intentionally so as to be different from each other in order to facilitate separation from each other. Accordingly, skill and labor is required because it is difficult to connect multi-core optical fibers even if the optical fiber inlets of the through-holes of the connecting member are provided as a conical hole or even if a V-groove table is provided for insertion guiding. Further, V-grooves should be made coincident with the inlets of the optical fiber connecting member because the optical fiber connecting member and the V-groove table are formed separately. Accordingly, considerable accuracy on production is required, so that increase in cost is brought about.

Further, in order to fix optical fibers in the connecting member, fusion fixture by means of fusion of the connecting member, fixture by means of an adhesive agent or mechanical fixture using upper and lower plates, or the like, is supposed. In the case of fusion fixture by means of fusion of the connecting member, discrepancy in the axis of optical fibers occurs easily because of heat and fluidity at the time of fusion of the connecting member. In the case of fixture using an adhesive agent, not only a large time is required for hardening the adhesive agent but also discrepancy in axis of optical fibers occurs easily at the time of the hardening of the adhesive agent. In the case of mechanical fixture using upper and lower plates, or the like, not only discrepancy in axis of optical fibers occurs in the same manner as described above but also mechanical distortion is given because pressure is applied to sides of optical fibers. In any fixture, there is a cause of the increase of the connecting loss.

SUMMARY OF THE INVENTION

It is therefore an object of the present invention to provide the shape of an optical fiber connecting member to solve the above problems, a method of producing the same, and a method of connecting optical fibers.

An optical fiber connecting member according to the present invention for connecting optical fibers by facing end portions of at least one pair of optical fibers, comprised of a rod-shaped body having: at least one through-hole in which the optical fibers is inserted; introduction portions being formed at opposite end portions of the rod-shaped body, in each of which at least one half of a cross-section of the through-hole is removed and remaining half of the cross-section is provided in the form of at least one introduction groove for guiding end portions of the optical fibers into the through-hole; and a retaining portion for retaining the optical fibers inserted in the through-hole.

The optical fiber connecting member according to the present invention is produced by a method of producing an optical fiber connecting member comprising the steps of: forming a plurality of circularly sectioned prepared holes axially in a columnar glass block so that the prepared holes are arranged in a line radially; heat-drawing the columnar glass block with its one end portion as a drawing-start end to form a small-diameter glass linear body; and cutting the small-diameter glass linear body into a predetermined length to form a glass rod-shaped body.

Further, a method of connecting optical fibers according to the present invention is comprised of the steps of: inserting at least one pair of optical fibers in an optical fiber connecting member according to the present invention from opposite end portions thereof so that said optical fibers are faced each other; and connecting said pair of optical fibers and fixing said optical fibers to said optical fiber connecting member.

As described above, in the optical fiber connecting member according to the present invention, introduction grooves are formed in opposite sides of the retaining portion integrally with through-holes. Accordingly, by pushing optical fibers along the introduction grooves, ends of the optical fibers can be inserted into the through-holes easily. The workability is improved extremely, so that the time required for connecting can be shortened.

Further, in the optical fiber connecting member according to the present invention, the through-holes can be formed accurately and easily merely by heat-drawing a columnar glass block having prepared holes formed therein and cutting the columnar glass block into a predetermined length. Further, the introduction grooves can be formed integrally with the through-holes easily by merely grinding or polishing the glass block.

Further, in the optical fiber connecting member according to the present invention, fixture of connecting due to fusion is performed without the necessity of axis alignment of the optical fibers by carrying out heating by means of arc discharge, or the like, for connecting. Accordingly, high-reliable connecting can be formed.

BRIEF DESCRIPTION OF THE DRAWINGS

In the accompanying drawings:

FIG. 1 is a view showing the configuration of an optical fiber connecting member according to the present invention;

FIG. 3 is a sectional view showing the configuration of an introduction portion of the optical fiber connecting member according to the present invention;

FIG. 7 is a view showing an embodiment in which a slit is provided in the retaining portion of the optical fiber connecting member according to the present invention;

FIG. 8 is a graph showing the change of thermal expansion coefficient in the case where additives are supplied to silica glass;

FIGS. 15A to 15D are views for explaining another embodiment of the introduction groove forming method in the producing method according to the present invention;

FIGS. 16A and 16B are views for explaining the connecting method using the optical fiber connecting member according to the present invention;

FIG. 17 is a view for explaining a method of heating the connecting member in the connecting method according to the present invention;

FIGS. 19A and 19B are perspective view for explaining a method of reinforcement in the connecting method according to the present invention.

PREFERRED EMBODIMENTS OF THE INVENTION

Figure 2A:
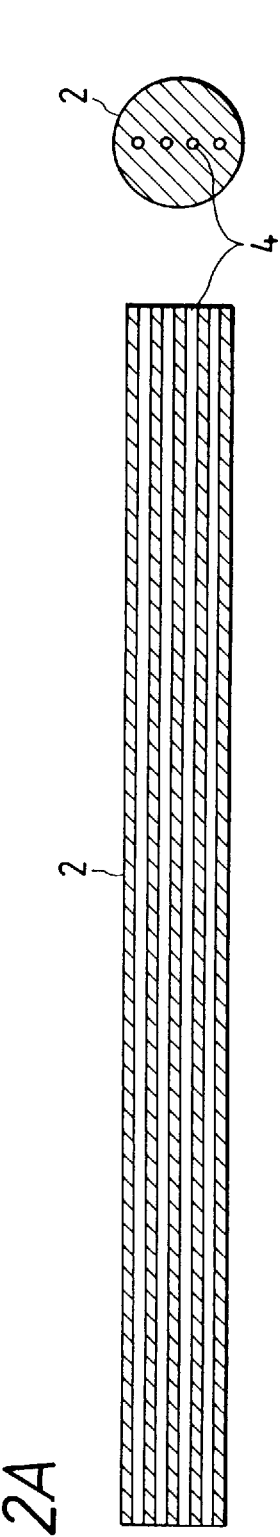
FIGS. 2A to 2C are sectional views showing the configuration of a retaining portion of the optical fiber connecting member according to the present invention.

Preferred embodiments of the present invention will be described referring to the accompanying drawings as follows.

First, an optical fiber connecting member according to the present invention will be described.

As shown in FIG. 1, the optical fiber connecting member 1 according to the present invention is configured by forming at least one through-hole 4 in a rod-shaped body. Each of the opposite end portions of the rod-shaped body is formed as an introduction portion 3 in which a nearly half portion of the through-hole 4 is removed while the remaining half portion of the through-hole 4 is exposed as an introduction groove 5 communicated with the through-hole 4. An intermediate portion of the rod-shaped body is formed as a retaining portion 2 for retaining the facing of end portions of optical fibers inserted into the through-hole 4.

Optical fibers to be connected are inserted into the through-hole 4 smoothly by pushing the optical fibers ahead while making the respective end portions of the optical fibers contact to the wall surfaces of the introduction grooves 5 on the opposite ends of the connecting member 1.

The inner diameter of the through-hole 4 is made to be slightly larger than the outer diameter of each of the optical fibers to be connected. As the difference between the outer diameter of the optical fibers to be connected and the inner diameter of the through-hole 4 decreases, the degree of coincidence between optical axes of the optical fibers to be faced each other can be made high to reduce the connecting loss after formation of the connecting. If the difference between the outer diameter of the optical fibers and the inner diameter of the through-hole is too small, however, the insertion of the optical fibers into the through-hole is difficult so that the connecting loss increases because of incompletion of the facing, or the like. Accordingly, the difference has a limit as a matter of course. The limit value of the difference is determined under the consideration of error, or the like, in production of the optical fibers and the optical fiber connecting member.

Figure 2B:
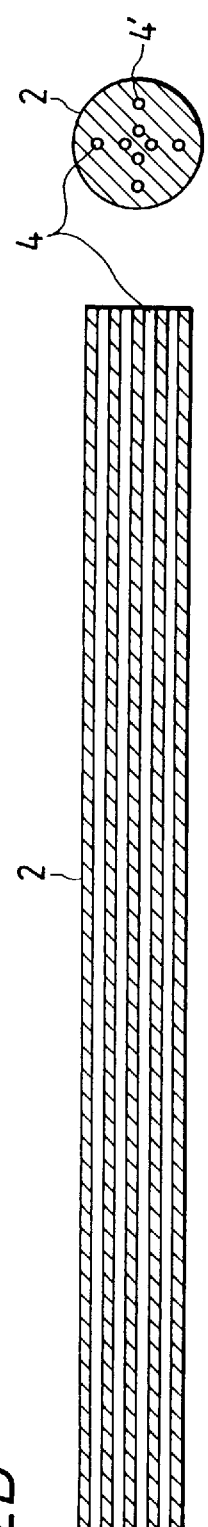
Figure 2C:
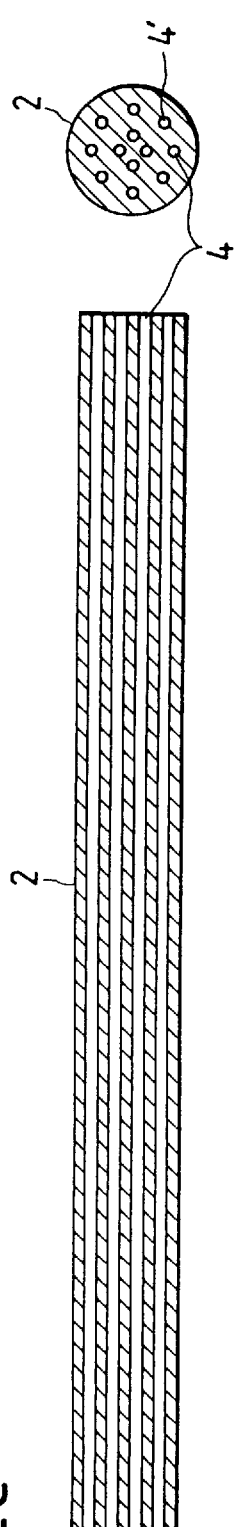

It is preferable from the point of view of production that the retaining portion 2 of the connecting member 1 is provided so that the cross-section thereof is shaped like a circle as shown in FIGS. 2A to 2C. Further, from the point of view that the introduction grooves 5 can be formed easily when the opposite end portions of the connecting member 1 are cut semicolumnarly as shown in FIG. 1, the through-holes 4 are preferably formed so as to be diametrically aligned. In the case where the through-holes 4 are formed only in one line transversely as shown in FIG. 2A, the cross-section of the retaining portion 2 is however apt to be shaped like an ellipse with the direction of alignment of the through-holes as its minor axis and with a direction perpendicular to the direction of alignment of the through-holes as its major axis in the drawing process in production of the connecting member. The circular cross-section of the retaining portion 2 can be secured if dummy through-holes 4' for balance are provided in a direction perpendicular to the direction of alignment of the through-holes 4 as shown in FIGS. 2B and 2C.

It is apparent from the problems to be solved by the present invention that it is not always necessary to make the cross-section of the retaining portion 2 circular, and the cross-section of the retaining portion 2 may be elliptical or square if the accuracy, the distance, etc. of the through-holes 4 can be secured.

For the purpose of connecting of single-core optical fibers, only one through-hole 4 may be formed in the center of the connecting member. When a plurality of through-holes are, however, required for the purpose of connecting of multi-core optical fibers, or the like, preferably, the through-holes are formed so as to be aligned in the center of the cross-section of the connecting member 1 and so as to be parallel with each other in the axial direction of the connecting member 1. This is because, particularly in the case of connecting of tape-shaped multi-core optical fibers, it is not only necessary but also preferable from the point of view of producing efficiency that optical fibers are inserted in the plurality of through-holes 4 simultaneously with the arrangement in which the edges of optical fiber end portions are cut evenly in one plane and in which the optical fibers are aligned with each other.

The introduction grooves 5 are preferably formed by further removing the thickness Δt than the respective centers 15 of the cross-section of the through-holes as shown in FIG. 3. If the removed portion represented by the broken line in FIG. 3 is smaller than a half of the cross-sectional area of the through-holes, it may be impossible to give insertion of the optical fibers 16 into the through-holes 4 smoothly because the end portions of optical fibers sometimes cannot be inserted into the introduction grooves 5 so as to be floated-up state. Accordingly, the removed portion is made to be larger than a half of the cross-sectional area of the through-holes so as to secure the optical fiber insertion guiding function of an introduction portion.

Figure 4A:
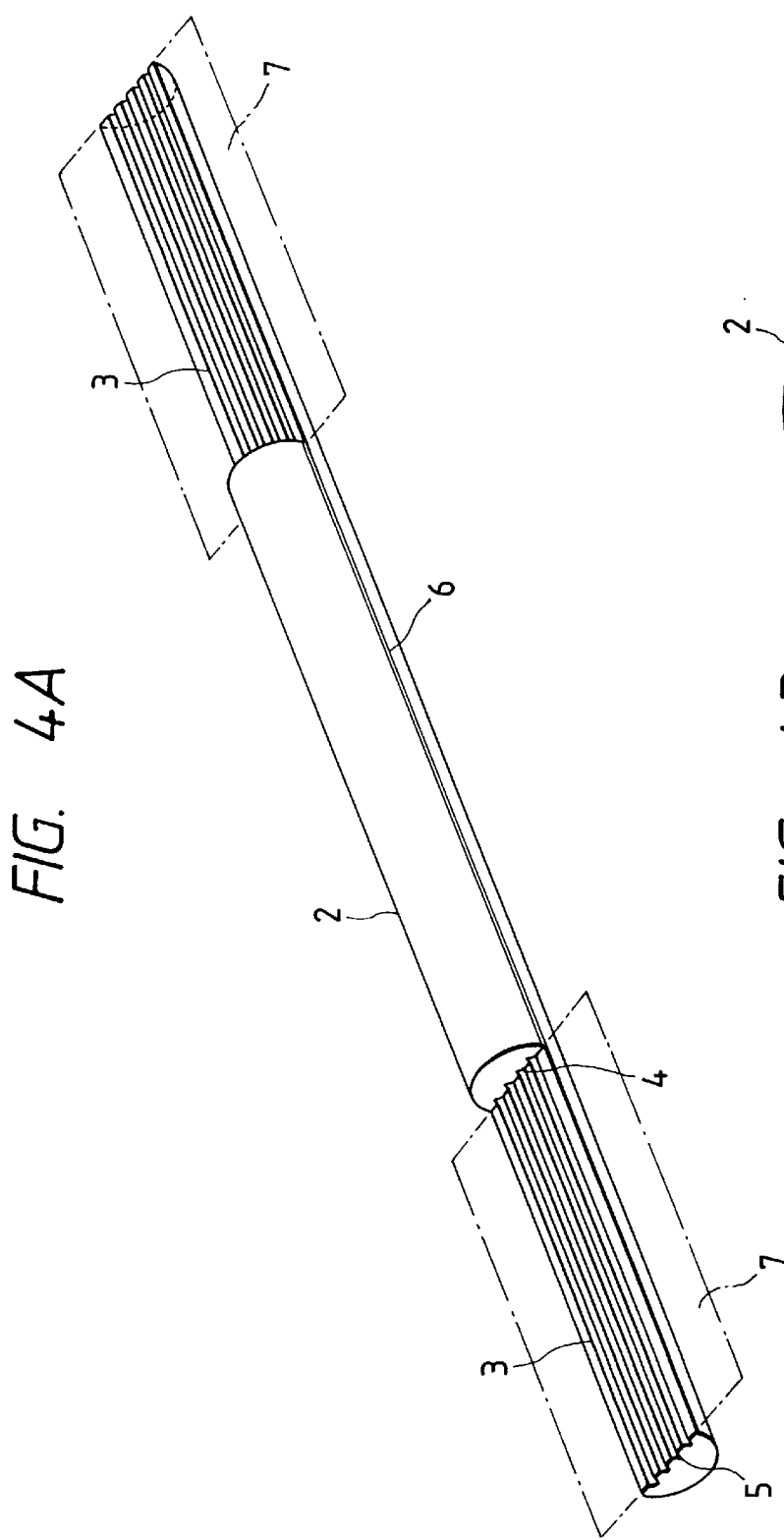
FIGS. 4A and 4B are views for explaining a part of the shape of the optical fiber connecting member according to the present invention.

Opening surfaces 7 in which the introduction grooves 5 are exposed are preferably formed on the same side in the opposite end portions of the connecting member as shown in FIG. 4A. This is a preferred form from the points of view of easiness of formation of the introduction portion 3 on production, easiness of insertion of optical fibers into the through-holes 4 and workability in fixture of connecting.

Figure 4B:
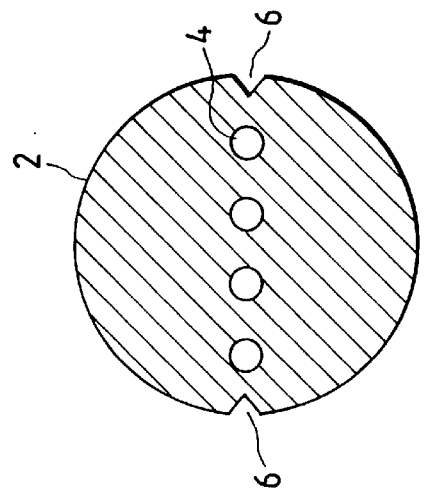

For example, as shown in FIG. 4B, positioning grooves 6 are formed, for example, in alignment with the through-holes 4 in the outer surface of the retaining portion 2 so that a connecting apparatus such as a fusion connecting apparatus, or the like, carries out connecting work easily by using the positioning grooves while the connecting member is grasped and fixed in a predetermined position as will be described later.

Figure 5A:
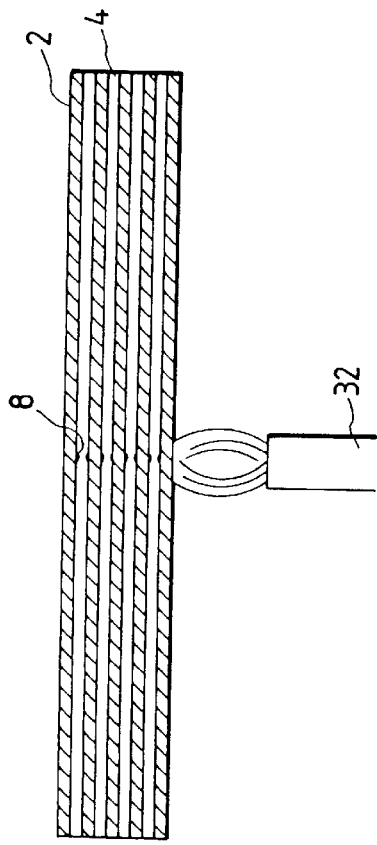
FIGS. 5A and 5B are sectional views showing an embodiment in which small-diameter portions are provided in the retaining portion of the optical fiber connecting member according to the present invention.
Figure 5B:
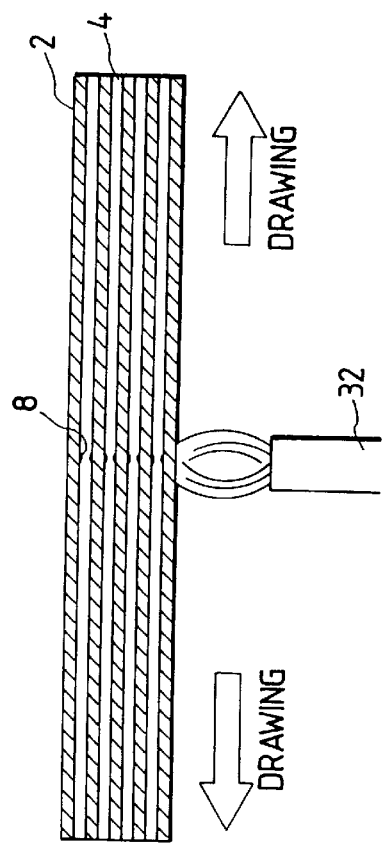

As shown in FIGS. 5A and 5B, a small-diameter portion 8 having a diameter smaller than the outer diameter of an optical fiber to be inserted may be formed in the intermediate portion in each of the through-holes 4 of the retaining portion 2 so that an end of each of the optical fibers can be stopped by the small-diameter portion 8 to thereby set the facing position. Because the facing position is set to be nearly constant, evenness of connecting work can be attained. Accordingly, not only variation in connecting loss can be reduced but also reliability upon the formation of connecting can be improved. Although a gap is formed in the facing portion when optical fibers are faced each other through the small-diameter portion 8, the connecting loss can be reduced by pouring matching oil into the gap portion.

The small-diameter portion 8 can be formed by partially heat-fusing the intermediate portion of the through-hole 4 as shown in FIG. 5A or by drawing the heated portion as shown in FIG. 5B.

Figure 6:
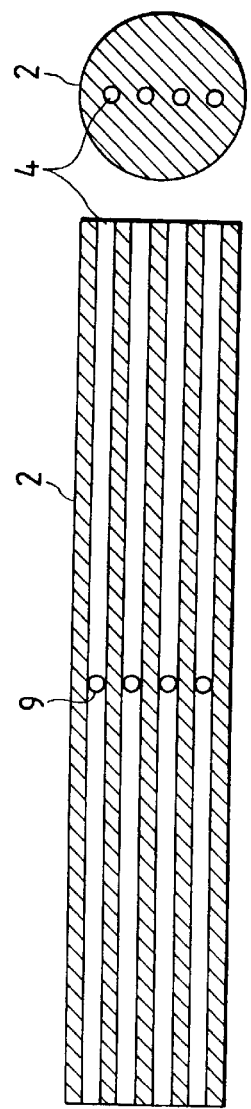
FIG. 6 is a sectional view showing an embodiment in which spherical bodies are put in the retaining portion of the optical fiber connecting member according to the present invention.

Further, instead of the formation of the small-diameter portions 8, small transparent spherical bodies 9 formed from the same material as that of optical fibers may be put in the intermediate portions of the through-holes 4 as shown in FIG. 6. In the case of glass optical fibers, glass balls are used. For insertion of the glass balls, it is possible to consider a method in which glass balls are fixed and held by partial heating as shown in FIGS. 5A and 5B after positioning rods are inserted from one insertion side and the glass balls are inserted from the other insertion side.

FIG. 7 shows the configuration of a connecting member in which a slit 10 reaching the through-holes 4 is formed in the center of the retaining portion 2. Various functions can be given to the slit 10. For example, there may be considered use of the slit 10 as a facing line for optical fibers, use of the slit 10 as an air escape hole for smooth insertion of optical fibers into the through-holes 4, use of the slit 10 as a hole for injecting matching oil, use of the slit 10 as an inlet for injecting an adhesive agent into the through-holes to fix connecting of optical fibers, and the like.

Further, a transparent plate 11 formed from the same material as that of optical fibers may be inserted into the slit 10 so that the facing portion of optical fibers can be positioned in the same manner as described above with reference to FIG. 5A, 5B or 6. Because merely the slit and the transparent plate are inserted, easy formation can be made compared with the configuration shown in FIG. 5A, 5B or 6.

Further, a transparent plate coated with an antireflection film may be used as the transparent plate 11 so that reflection in optical connecting is prevented to make it possible to reduce the connecting loss.

As optical fibers for use for optical communication, there are used plastic optical fibers and glass optical fibers. The connecting member for glass optical fibers is preferably formed from silica glass mainly containing $SiO_2$ which is the same material as that of optical fibers, because the connecting material is integrated with the optical fibers. Further, it is also preferable from the point of view of temperature stability that the connecting member is formed from silica glass having a thermal expansion coefficient substantially equal to that of optical fibers to be connected so that it is possible to avoid a problem of occurrence of disconnecting because of physical distortion caused by a difference in thermal expansion due to a change in temperature in the condition of use. FIG. 8 shows the change of thermal expansion coefficient due to additives supplied to silica glass. The thermal expansion coefficient of the connecting member is preferably limited to be in a range of $\pm 0.5 \times 10^{-6}$ of the thermal expansion coefficient of optical fibers.

Figure 9A:
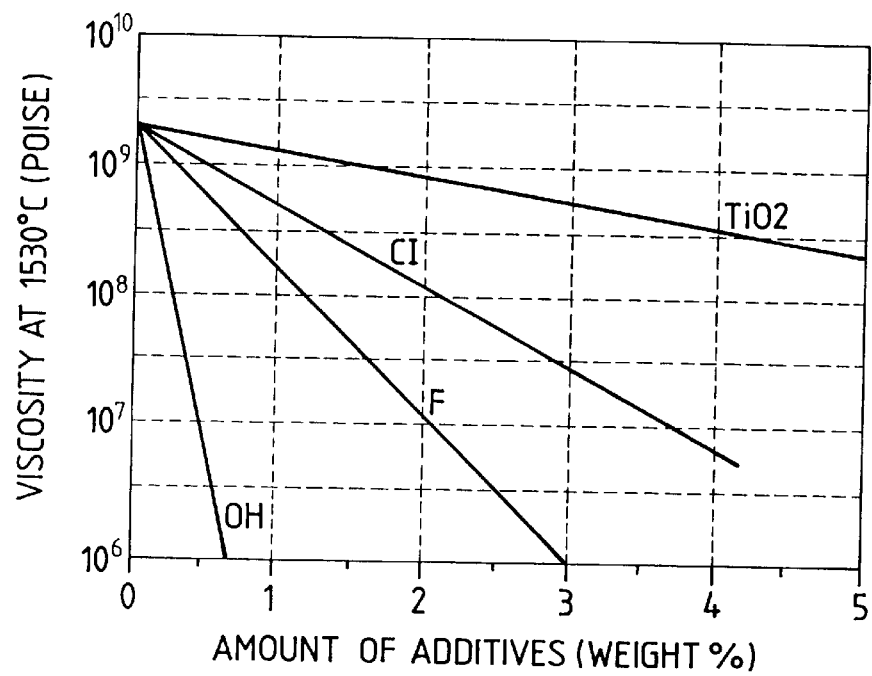
FIG. 9A is a graph showing the change of viscosity in the case where additives are supplied to silica glass.
Figure 9B:
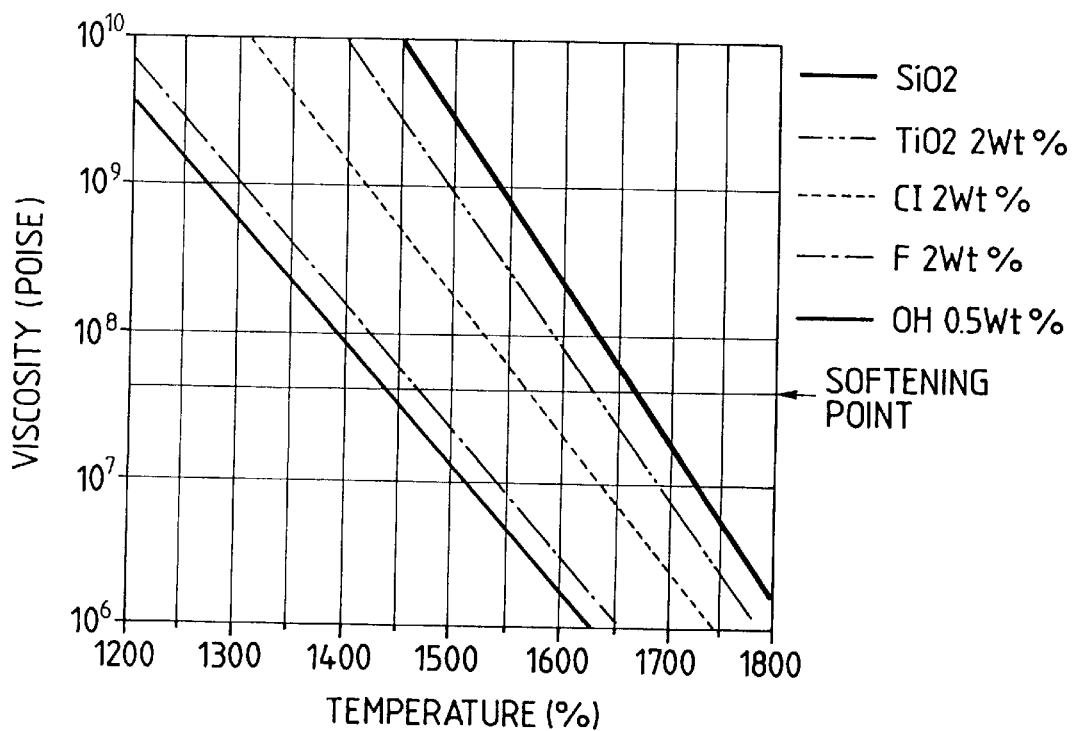
FIG. 9B is a graph showing the change of softening temperature in the case where additives are supplied to silica glass.

When the connecting member is heated at the time of connecting of optical fibers while optical fibers are faced each other in the through-holes, the inner diameter of the through-holes is contracted because softening of the connecting member. Accordingly, the axis of optical fibers is automatically aligned to make the formation of optical connecting better. In the case where connecting is performed by heating the connecting member, the connecting member is formed from silica glass having a softening temperature equal to or preferably slightly lower than that of optical fibers in order to avoid the softening and deformation of optical fibers before the heat-softening of the connecting member. Specifically, the softening point of the glass can be obtained from the relation of temperature and viscosity as shown in FIG. 9B in which the softening point (softening temperature) is defined as a temperature where the viscosity is $10^{7.6}$. In a typical single-mode optical fiber, the core is silica glass containing 5–6 wt % of $GeO_2$ and the clad is pure silica glass. Accordingly, the softening temperature of the typical single-mode optical fiber is 1660°–1680° C. because it is considered as $SiO_2$ as shown in FIG. 9B. Further, a temperature where the viscosity becomes $10^5$ poise is called "flow point". Generally, glass process is performed under a temperature higher than softening point (temperature) but lower than flow point (temperature). In the present invention, it is preferable that during heating process the temperature of the optical fiber becomes lower than the softening point and that of the connecting member becomes higher than flow point. Therefore, the maximum difference between the softening temperatures of the optical fiber and the connecting member is about 250° C. according to FIG. 9B.

If glass optical fibers are single-mode type fibers, the thermal expansion coefficient and softening temperature of the connecting member are set based on comparison with silica glass of a clad portion which is an overwhelming majority compared with a core portion. If glass optical fibers are multi-mode type fibers large in core size or fibers having clads supplied with dopant, the thermal expansion coefficient and softening temperature of the connecting member vary in accordance with the respective composition.

The softening temperature of the connecting member formed from silica glass can be lowered by addition of a fluorine, a chlorine, a hydroxyl group (OH group) or a titanium dioxide. Besides the aforementioned additives, $GeO_2$, $P_2O_5$, $B_2O_3$, or the like, is a component for lowering the softening temperature of silica glass but composition distortion occurs easily because even addition at the time of the formation of the glass mother material is difficult. Accordingly, a hole-forming process for forming through-holes becomes difficult.

The softening temperature of silica glass is obtained on the basis of the relation with "temperature-viscosity", characteristic. FIG. 9A shows "temperature-viscosity", characteristic of silica glass ($SiO_2$) not containing any of such additives as described above and "temperature-viscosity" characteristic in the cases where 2 wt % of a titanium dioxide, 2 wt % of a chlorine, 2 wt % of a fluorine and 0.5 wt % of a hydroxyl group are added to the silica glass individually, respectively. The temperature (softening temperature) of a softening point (softening viscosity) at which softening starts is obtained. The viscosity of silica glass can be reduced by increasing the amount of additives as shown in FIG. 9B. The lower limit value of the softening temperature of the connecting member is not limited specifically but the softening temperature of the connecting member is preferably selected to be about 1300° C. because it is undesirable that a too large difference is created between the glass viscosity of the connecting member and the glass viscosity of glass optical fibers.

Further, when a fluorine or a hydroxyl group is added to silica glass, the light refracting index of the silica glass is reduced. If a connecting member formed from such glass is used, light once radiated to the outside of optical fibers may enter into the optical fibers again from the connecting member to thereby reduce the quality of signal light. To avoid this phenomenon, it is preferable to make the refracting index of the connecting member larger than that of optical fibers. In this respect, addition of a chlorine or a hydroxyl group can increase the refracting index of silica glass by a value of from about 0.05 to about 0.1%. Accordingly, it may be designed so that the optimum value is obtained by using a plurality of additives in combination from these additives.

From the point of view of thermal expansion coefficient, softening temperature or refracting index as described above, the glass optical fiber connecting member is preferably formed from silica glass containing additives singly or in combination as follows: 0.5 wt % or less of a hydroxyl group; 2wt % or less of a fluorine; 3.5 wt % or less of a chlorine; and 8 wt % or less of a titanium dioxide.

Next, a method of producing a silica glass type connecting member used for connecting of glass optical fibers will be described with reference to FIGS. 10A to 13.

First, a glass mother material containing $SiO_2$ as a main component is prepared by one of various methods such as a VAD method, an OVD method, a direct method, a sol-gel method, and so on.

In the case of a titanium dioxide, addition of the additives to silica glass can be made by mixing $TiCl_4$ in $SiCl_4$ which is a raw-material gas for flame hydrolysis. In the case of addition of a fluorine, a composition gas such as $SF_6$, $CF_4$, $SiF_4$, or the like, is used. In the case of addition of a chlorine, a gas such as $Cl_2$, $CCl_4$, $SiCl_4$, or the like, is used. The introduction of a hydroxyl group can be made in a range of from 700 to 1000 ppm by generating transparent glass in oxyhydrogen flame in a direct method. Alternatively, there is a method in which a smoked glass body is exposed to an atmosphere containing water vapor when transparent glass is formed from the smoked glass body, or the like.

Figure 10A:
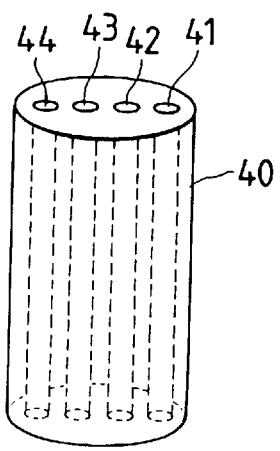
FIGS. 10A to 10C are side views for explaining a method of producing the optical fiber connecting member according to the present invention.
Figure 10B:
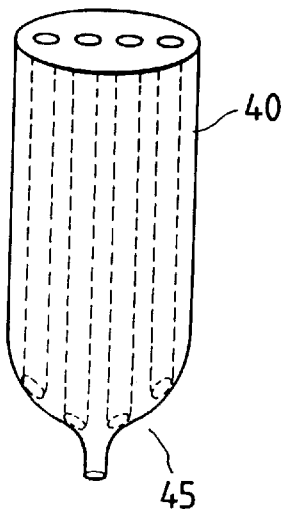
Figure 10C:
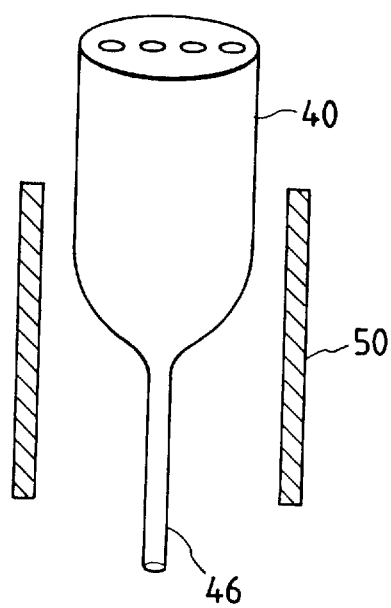

The glass mother material is then drawn or ground to form a columnar glass block 40 having a desired diameter as shown in FIG. 10A. Further, a plurality of prepared holes 41 to 44 which become through-holes are provided in the glass block 10 so as to be symmetric with respect to the center of the block. Incidentally, if only one prepared hole is required, the prepared hole may be provided in the center of the block. This prepared hole may be provided by a method of ultrasonic processing, or the like.

Thereafter, a dummy member for drawing is fusion-welded with one end of the glass block 40. After the glass block 40 is then heat-drawn to form a glass linear body 46 having a through-hole having a desired inner diameter, the glass linear body 46 is cut into a predetermined length to form a glass rod-shaped body.

If a plurality of prepared holes 41 to 44 are provided in the glass block 40 and an electric resistance heating furnace 50 surrounding the outer circumference of the glass block is used as a heat source which is a heating means for drawing the glass block, the prepared holes 41 and 44 near the outer circumference of the glass block are heated more intensively than the prepared holes 42 and 43 in the inside of the glass block. As a result, the diameter of the prepared holes 41 and 44 is apt to be reduced. Accordingly, the finished inner diameter of the through-holes near the outer circumference of the glass block becomes larger than that of the through-holes near the center of the glass block. Accordingly, the connecting loss slightly varies.

Figure 11:
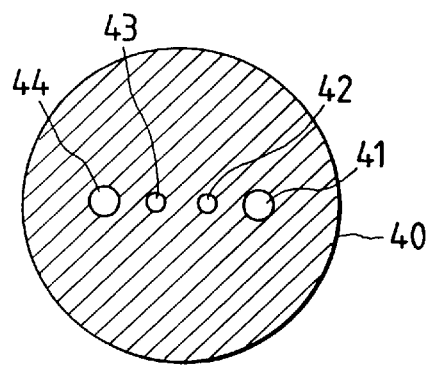
FIG. 11 is a view showing an embodiment in which prepared holes are formed in a glass block by the producing method according to the present invention.

In order to improve this disadvantage, the inner diameter of the prepared holes 41 and 44 formed in the outer circumferential side of the glass block 40 is formed so as to be larger than the inner diameter of the prepared holes 42 and 43 formed in the inside of the glass block in advance as shown in FIG. 11.

When the glass block 40 is heat-drawn while the dummy member for drawing is directly fusion-welded with one end of the glass block 40, a large deal of aborting portions are generated before the drawn outer diameter reaches a desired value. This is because the conical change of the shape have to be experienced for reducing the outer diameter of the glass block at the time of drawing. Therefore, the drawing-start end of the glass block 40 is preferably processed in the form of a cone 45 in advance in order to perform stable drawing speedily without production of such a large deal of aborting portions. The processing may be performed by a method of mechanical grinding or a method in which the drawing end of the glass block may be fused by another heating means, or the like, so as to be drawn in advance. Although the processing of the prepared holes may be carried out before or after the drawing end of the glass bock is shaped like a cone 45 in advance, the reduction of the diameter of the prepared holes near the outer circumference of the glass block can be suppressed more greatly when the processing is carried out after the drawing end is shaped like a cone.

Figure 12:
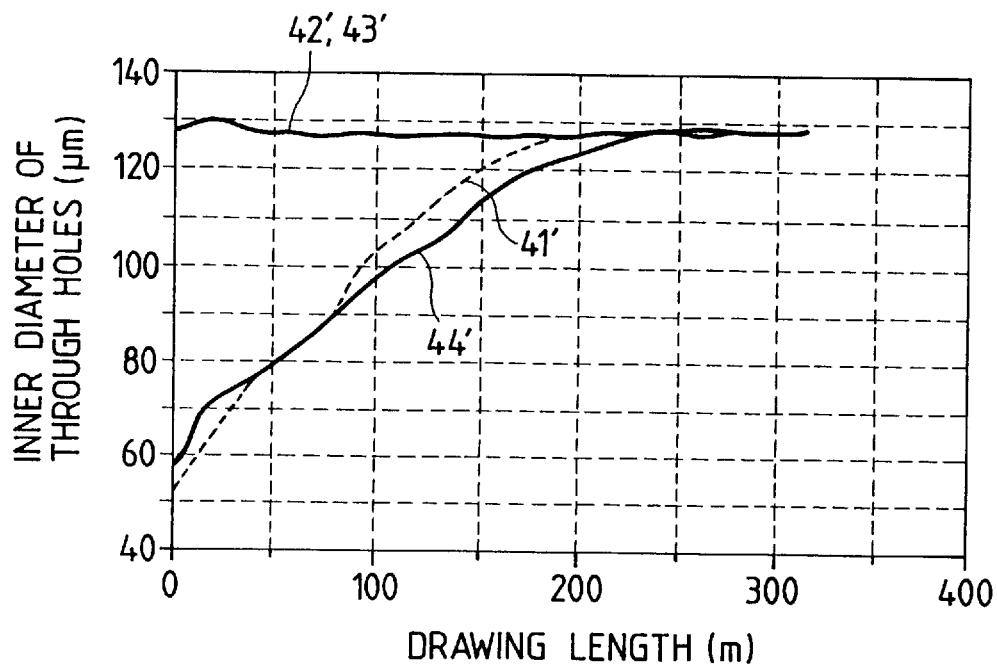
FIG. 12 is a graph showing the relation between the drawing length due to drawing of the glass block and the through-hole in the producing method according to the present invention.
Figure 13:
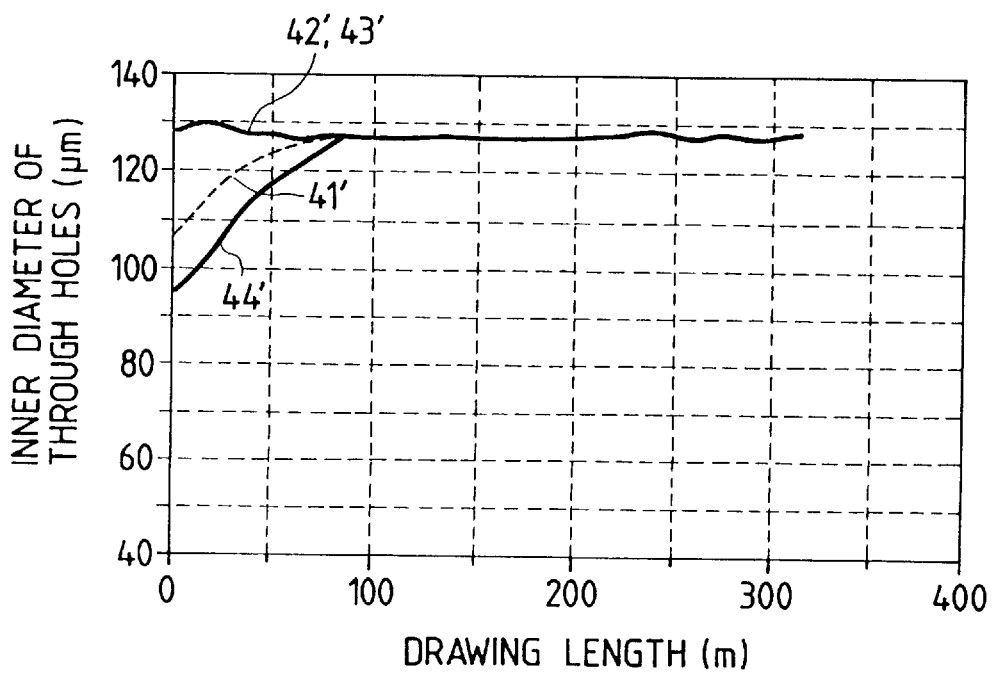
FIG. 13 is a graph showing the relation between the drawing length and the through-hole in the case where the glass block drawing method is improved in the producing method according to the present invention.

FIGS. 12 and 13 show situations of the change of the inner diameter of through-holes in the case where a glass block having an outer diameter of 50 mm is heat-drawn to obtain a glass linear body having an outer diameter of 1.28 mm.

FIG. 12 shows the case of heat-drawing the glass block without processing of the drawing-start end of the glass block into the form of a cone. A desired inner diameter is obtained in the through-holes 42' and 43' in the inside of the glass block when the glass block is drawn to about 30 m after the start of drawing, whereas a desired inner diameter is not obtained in the through-holes 41' and 44' in the outside of the glass block so that a large deal of wastes are produced because drawing does not reach a stationary state before the glass block is drawn to about 230 m.

FIG. 13 shows the case where the glass block is heat-drawn in the condition in which the drawing-start end of the glass block is processed to be in the form of a cone with a conical angle of about 60 degrees in advance. A desired inner diameter is obtained in the through-holes 42' and 43' in the inside of the glass block in the same manner as in FIG. 12 after the start of drawing, whereas a desired inner diameter is also obtained in the through-holes 41' and 44' in the outside of the glass block when the glass block is drawn to about 80 m. Accordingly, the quantity of wasteful drawing is suppressed.

Figure 14A:
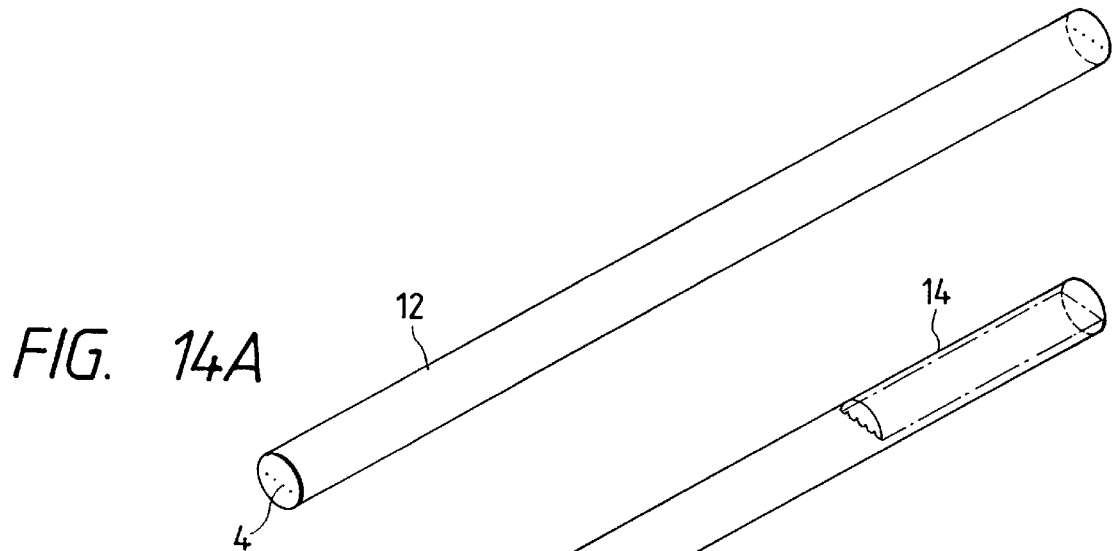
FIGS. 14A to 14D are views for explaining an embodiment of the introduction groove forming method in the producing method according to the present invention.
Figure 14B:
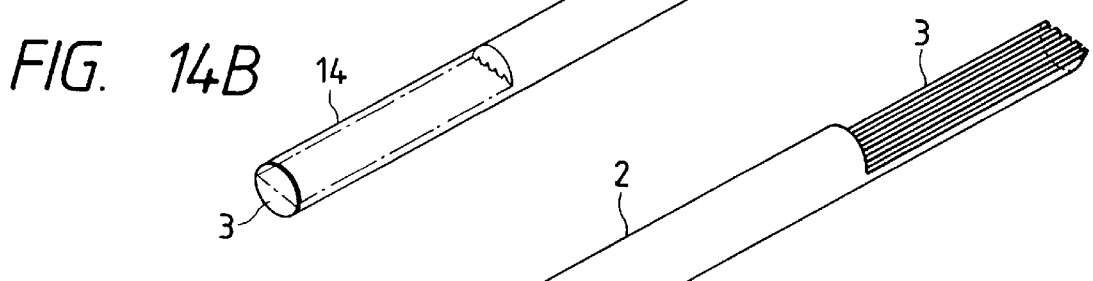
Figure 14C:
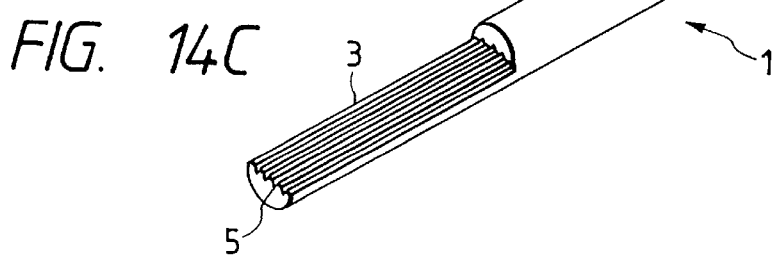
Figure 14D:
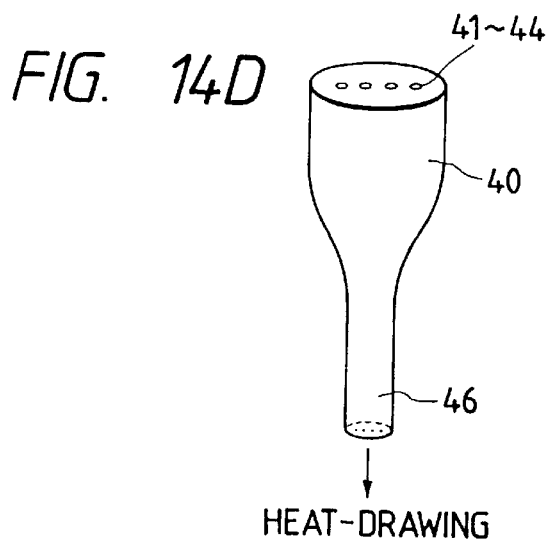

The glass linear body 46 thus heat-drawn as shown in FIG. 14D is cut into a predetermined length to form a glass rod-shaped body 12 as shown in FIGS. 14A to 14C. Introduction portions 3 in the opposite end portions of the glass rod-shaped body 12 are formed by cutting or grinding a nearly semicolumnar cut portion 14 so as to cross the respective nearly centers of the through-holes 4. As a result, at each end, a nearly half of each through-hole 4 is removed and the remaining half thereof is left as a semicircular groove communicated with the through-hole 4 of the optical fiber retaining portion 2 in the center portion which is not removed. The semicircular grooves are provided at the opposite ends as introduction grooves 5 for guiding insertion of end portions of optical fibers into the through hole 4.

Further, as shown in FIGS. 15A to 15D, the glass rod-shaped body 12, which is formed by the heat-drawing shown in FIG. 15D as similar to FIG. 14D, is divided into two parts so as to cross the respective nearly centers of the through-holes 4 to thus form semicolumnar members 13. One semicolumnar member 13 obtained by division into two parts is cut into a short length and joined with the center portion of the other semicolumnar member 13 by a suitable means so as to be united into one body. As a result, there is obtained a connecting member 1 having introduction portions 3 provided in opposite end portions and provided with introduction grooves 5 for guiding insertion of end portions of optical fibers into the through-holes 4 and having an optical fiber retaining portion 2 in the center portion, in the same manner as in FIG. 14C.

Further, a specific example will be described.

A glass block 40 made of quartz containing 0.6 wt % of a fluorine was formed as the mother material for the connecting member by a VAD method. The glass block was processed in the form of a column having an outer diameter of 50 mm and prepared holes 41 to 44 are formed in the arrangement shown in FIG. 11 at hole intervals of 10 mm. The diameter of the prepared hole 42 and 43 near the center of the glass block was made 5 mm, and the diameter of the prepared holes 41 and 44 in the outside of the glass block was made 6 mm. One end of the glass block 40 up to 50 mm from the end surface of the glass block was processed to be in the form of a cone and drawn by using an electric resistance heating furnace to form a glass linear body having an outer diameter of 1.28 mm. As a result, there was obtained a glass rod-shaped body in which: the hole interval between the through-holes was 255 $\mu$m; the diameter of the through-holes in the inside of the glass block was 127 $\mu$m; and the diameter of the through-holes in the outside of the glass block was 128 $\mu$m.

Opposite end portions of this glass rod-shaped body were removed by grinding in a method shown in FIGS. 14A to 14C to obtain an optical fiber connecting member according to the present invention. Tape-shaped four-core single-mode optical glass fibers were inserted in this optical fiber connecting member so as to be faced each other, and pushing force was applied to the optical fibers which will be described later, and the butt-joint position was heated by using arc discharge to thus form connecting. The optical loss due to the connecting was 0.15 dB, and the reflection attenuation quantity was not smaller than 55 dB. It was confirmed that complete light connecting was formed. Further, the quantity of the change of the loss in this connecting product was not larger than 0.02 dB in a temperature range of from −40 to +85° C., so that this connecting product exhibited very good characteristic.

Moreover, a method of connecting optical fibers by using the connecting member according to the present invention will be described with reference to FIGS. 16A to 19B.

FIGS. 16A and 16B shows that tape-shaped coated optical fiber cable 30 having four coated optical glass fibers 32 arranged in one line are inserted into the connecting member 1.

First, a coating 31 at a connecting end portion of the tape-shaped coated optical fiber cable 30 is removed by a predetermined length to expose optical fibers 32, and ends 33 of the optical fibers are cut and planished so as to be arranged in one line. After the end portion of the optical fiber cable 30 is processed, the ends 33 of the optical fibers are put into the introduction grooves 5 of the introduction portion 3 on one end of the connecting member 1, while slightly inclined and are forcedly forwarded so as to be slid in the grooves. Then, the ends 33 are inserted into the through-holes 4 of the retaining portion 2 which are formed integrally with the introduction grooves 5. The ends 33 of the optical fibers inserted into the through-holes 4 are faced each other at the center of the retaining portion 2, with the respective ends of optical fibers inserted into the through-holes 4 in the same manner as described above from the other end side of the connecting member 1. Further, if positioning members for facing of optical fibers are provided in the through-holes 4, the ends 33 of the optical fibers attach on the members so as to automatically stop the insertion.

After the optical fibers 32 are inserted into the connecting member 1 from its opposite sides, the connecting member 1 is heated in the vicinity of the facing of the optical fibers by discharge electrodes of an arc discharge as shown in FIG. 17. The connecting member is once expanded in the heating process by this heating, however thereafter, the inner diameter of the through-holes 4 is contracted when the temperature approaches the softening temperature. Accordingly, the axis alignment of the optical fibers inserted in the through-holes is performed automatically so as to obtain a good optical connecting condition. Further, in this occasion, the inner walls of the through-holes 4 are partially fused with the optical fibers so that connecting is fixed.

Further, when discharge-heating is performed in the condition in which the ends of the optical fibers inserted into the connecting member 1 are faced so as to come into contact with each other and pushing force is applied to the optical fibers, the respective end portions 33 of the optical fibers inserted in the opposite directions are fused with each other so that fusion connecting can be formed before the connecting member is fused with the optical fibers. This is considered to be caused by a difference in heat capacity between the connecting member and the optical fibers because not only the optical fibers are floated up in the through-holes but also the volume of the optical fibers is so small that the ratio of the volume of the optical fibers to the volume of the connecting member is one to several tens.

Although, the discharge electrodes are used as a heating means in this embodiment because arc discharge heating is effective from the point of view that in that control on the quantity of heating and setting of the heating position can be made accurately, any other heating means such as resistance heating, dielectric heating, torch, or the like, may be used.

Further, if the inner diameter of the through-holes 4 in the optical fiber connecting member according to the present invention is formed with very good accuracy (from +0.5 to 2$\mu$m) compared with the outer diameter of the optical fibers 32, the aforementioned heating is not always required and fixture may be made by means of an adhesive agent 34. In this case, there is required only application of the adhesive agent 34 by using a flat surface in which the introduction grooves 5 in the introduction portion 3 of the connecting member 1 are formed. In this case, the workability is very excellent.

Further, even if fixture of connecting between optical fibers is obtained by heating the connecting member, the aforementioned adhesive agent 34 may be used additionally in order to make the connecting more securely.

Alternatively, the optical fibers may be inserted into the connecting member after an adhesive agent is applied in advance onto the rear portions of the optical fibers except portions near the ends of the optical fibers, or an adhesive agent relatively low in viscosity may be poured into the through-holes after the optical fibers are inserted into the connecting member so as to be connected to each other.

Incidentally, in the configuration in which a gap is created in the joint portion of the optical fibers, the ends 33 of the optical fibers may be preferably inserted into the connecting member in the condition in which matching oil is given to the ends 33 of the optical fibers, or the through-holes may be filled with matching oil in advance.

Figure 18:
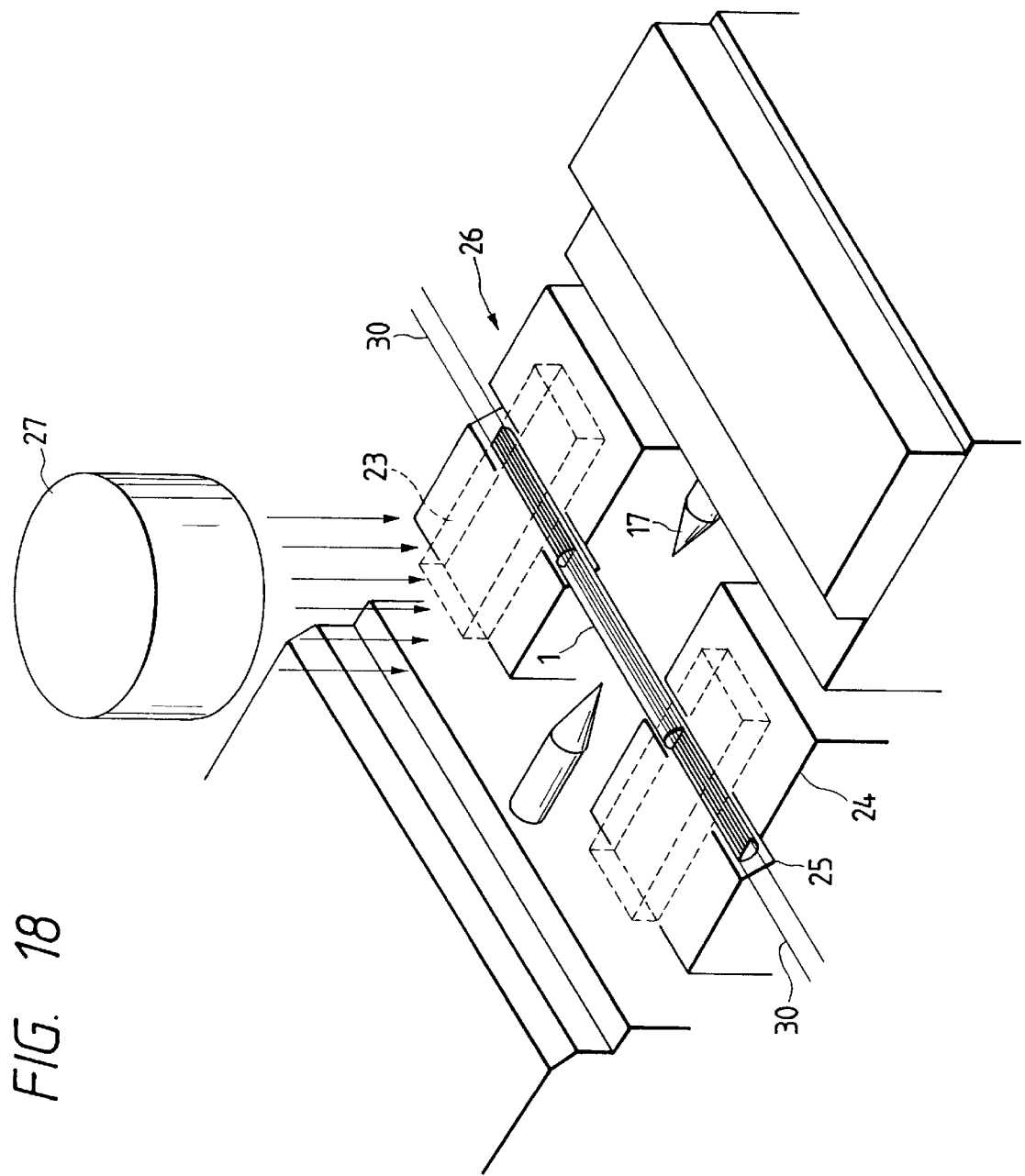
FIG. 18 is a view showing an example in which heating of the connecting member is performed by a fusion connecting apparatus in the connecting method according to the present invention.

The discharge electrodes for the arc discharge can be used a fusion connecting apparatus as used in fusion connecting as shown in FIG. 18. The fusion connecting apparatus, however, need not be so accurate as to have axis alignment functions compared with the fusion connecting apparatus which is used generally. That is, a low-cost simple fusion connecting apparatus suffices for the purpose. This fusion connecting apparatus has a grasping mechanism 26 composed of tables 24 for putting the connecting member 1 thereon and fixture blocks 23, discharge electrodes 17 for generating arc discharge, and an illumination device 27.

The connecting member 1 is positioned by and mounted on V-grooves 25 formed in the tables 24 and grasped and fixed by the fixture blocks 23. The optical fibers may be inserted into the connecting member 1 before or after the connecting member 1 is mounted on the apparatus. Then the facing state of the optical fibers is confirmed by using the illumination device 27 and an observation mechanism not shown, the positions of the discharge electrodes 17 are set, and then the connecting member is heated by arc discharge. Incidentally, two pairs of discharge electrodes 17 may be provided so that the Opposite sides of the facing portion of the optical fibers are heated separately.

After the connecting of optical fibers is formed with use of the connecting member 1 by the aforementioned various methods, the connecting portion is reinforced by a reinforcing member 22 as shown in FIGS. 19A and 19B. The reinforcing member 22 is composed of a hot-melt member 19 such as a tube, or the like, an aggregate 20 made of a rigid rod, and a heat-shrinkable tube 21 for housing these parts. The hot-melt member 19 such as a tube and the heat-shrinkable tube 21 are made to pass onto the optical fiber cable 30 before the optical fibers are connected, so that the hot-melt member 19 and the heat-shrinkable tube 21 are moved on the connecting member 1 after the optical fibers are connected. The hot-melt member 19 is melted by heating so that not only the connecting member 1 and the aggregate 20 are united into one body but also the heat-shrinkable tube 21 is shrunk by heating to thereby reinforce the connecting portion.

Incidentally, the aforementioned configuration concerning the introduction grooves 5 of the optical fiber connecting member can be applied to the configuration in which optical fibers are inserted and fixed into a detachable type optical connecter capable of disconnecting the optical fibers.

As described above, in the optical fiber connecting member according to the present invention, introduction grooves are formed in opposite sides of the retaining portion integrally with through-holes. Accordingly, by pushing optical fibers along the introduction grooves, ends of the optical fibers can be inserted into the through-holes easily. The workability is improved extremely, so that the time required for connecting can be shortened.

Further, in the optical fiber connecting member according to the present invention, the through-holes can be formed accurately and easily merely by heat-drawing a columnar glass block having prepared holes formed therein and cutting the columnar glass block into a predetermined length. Further, the introduction grooves can be formed integrally with the through-holes easily by merely grinding or polishing the glass block.

Further, in the optical fiber connecting member according to the present invention, fixture of connecting due to fusion is performed without the necessity of axis alignment of the optical fibers by carrying out heating by means of arc discharge, or the like, for connecting. Accordingly, high-reliable connecting can be formed.

What is claimed is:

1. A method of connecting optical fibers comprising the steps of:
    inserting at least one pair of optical fibers in an optical fiber connecting member from opposite end portions thereof so that said optical fibers are faced each other, said optical fiber connecting member comprising a rod-shaped body having:
        at least one through-hole in which said optical fibers is inserted;
        introduction portions being formed at opposite end portions of said rod-shaped body, in each of which at least one half of a cross-section of said through-hole is removed and remaining half of said cross-section is provided in the form of at least one introduction groove for guiding end portions of said optical fibers into said through-hole; and
        a retaining portion for retaining said optical fibers inserted in said through-hole; and
    connecting said pair of optical fibers and fixing said optical fibers to said optical fiber connecting member.

2. A method of connecting optical fibers according to claim 1, wherein said optical fiber connecting member is heated so that said optical fibers and said connecting members are partially fused and integrated with each other.

3. A method of connecting optical fibers according to claim 1, wherein said optical fiber connecting member is heated while pushing force is given to said optical fibers so that end portions of said optical fibers are directly fused with each other.

4. A method of connecting optical fibers according to claim 1, wherein said optical fibers are fixed to said optical fiber connecting member at said introduction portion by an adhesive agent.

5. A method of connecting optical fibers according to claim 2, wherein the heating of the said optical fiber connecting member is performed by arc discharge.

6. A method of connecting optical fibers according to claim 3, wherein the heating of the said optical fiber connecting member is performed by arc discharge.

7. A method of connecting optical fibers according to claim 1, wherein said through-hole is filled with an adhesive agent.

8. A method of connecting optical fibers according to any one of claims 1 to 7, further comprising the step of: reinforcing said optical fiber connecting member and said connected optical fibers; said reinforcing being provided by a combination of a hot-melt member, a rigid rod, and a heat-shrinkable tube, said heat-shrinkable tube enclosing said hot-melt member and said rigid rod.

* * * * *